Figure 1:
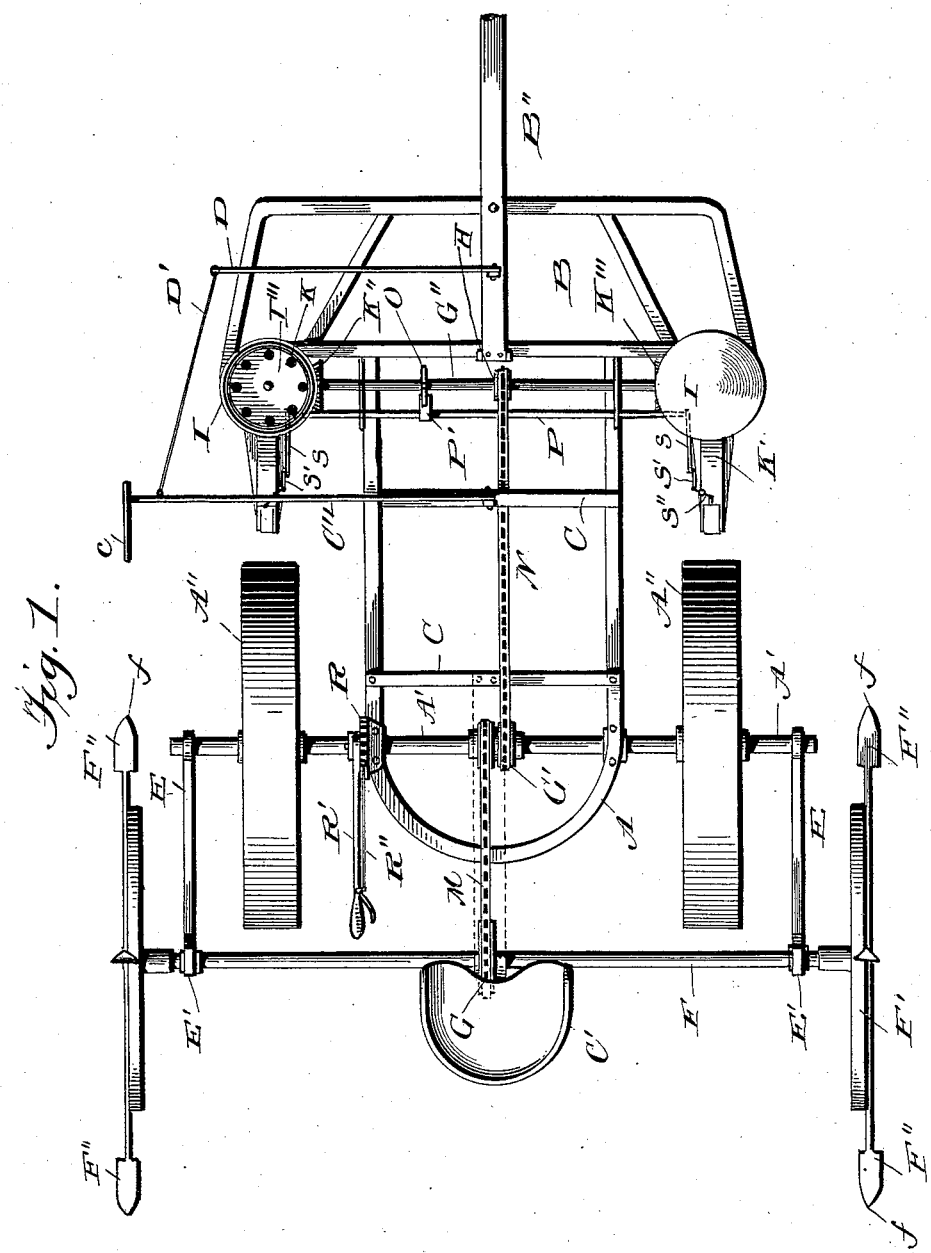

(No Model.) 3 Sheets—Sheet 1.
W. H. JARMIN.
CHECK ROW ATTACHMENT FOR CORN PLANTERS.
No. 565,902. Patented Aug. 18, 1896.

Witnesses:
L. C. Hills
J. W. Fowler Jr.

Inventor:
Walter H. Jarmin,
by Chas. E. Adamson,
his Atty.

(No Model.) 3 Sheets—Sheet 2.
W. H. JARMIN.
CHECK ROW ATTACHMENT FOR CORN PLANTERS.
No. 565,902. Patented Aug. 18, 1896.
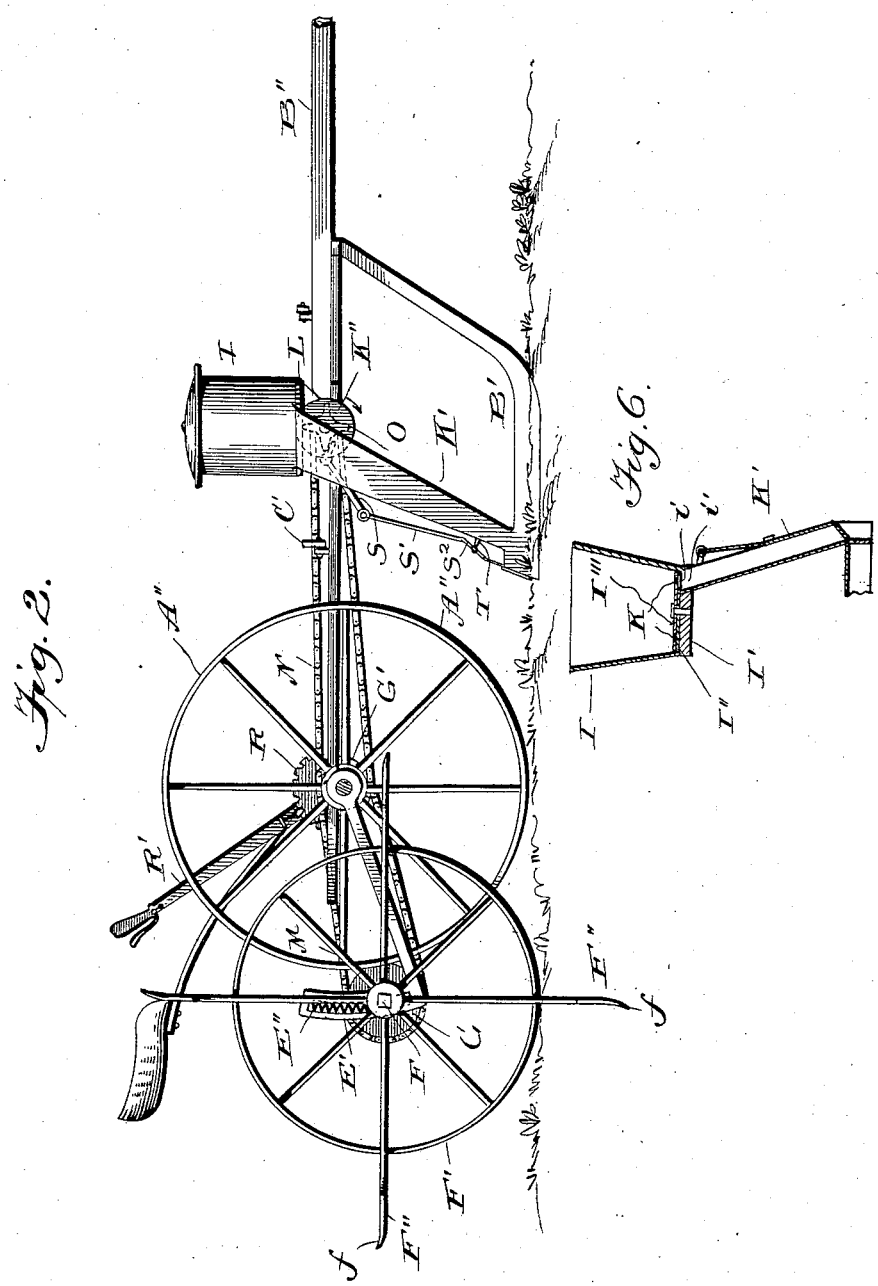

(No Model.)  3 Sheets—Sheet 3.
W. H. JARMIN.
CHECK ROW ATTACHMENT FOR CORN PLANTERS.
No. 565,902.  Patented Aug. 18, 1896.
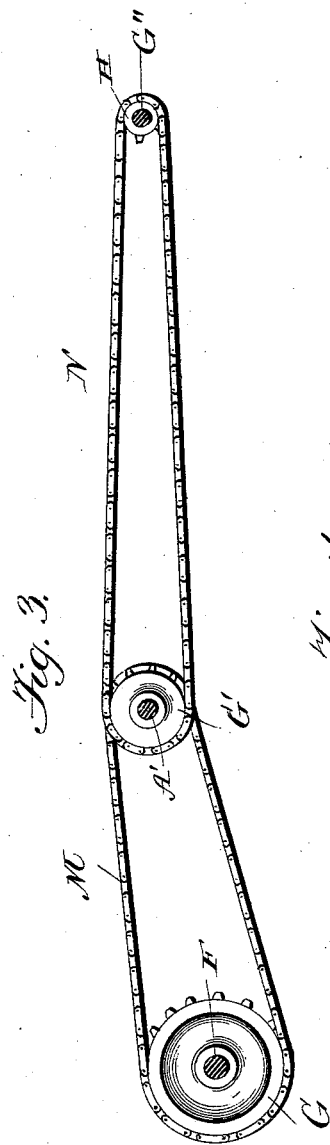
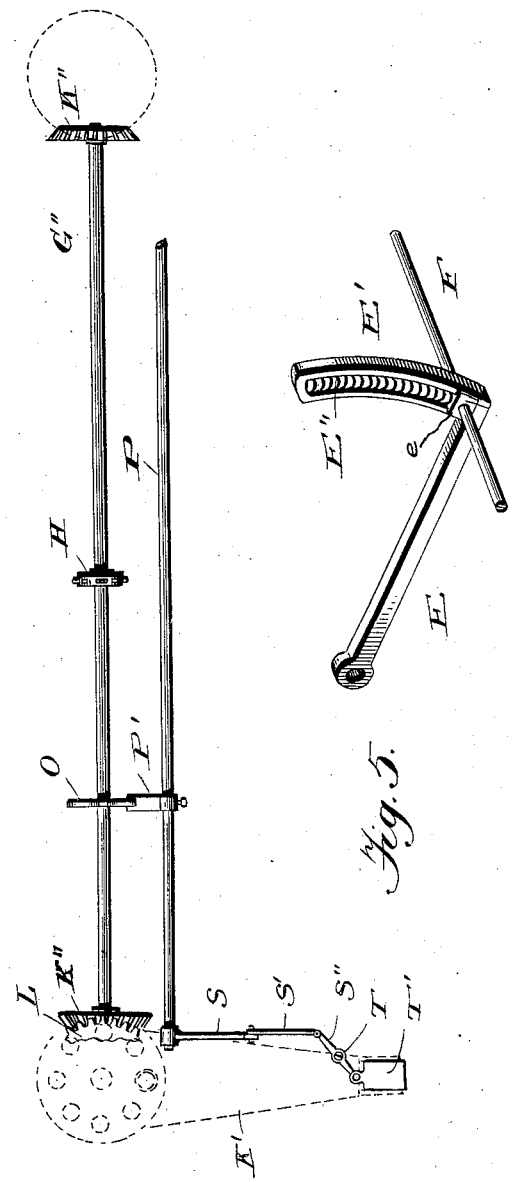
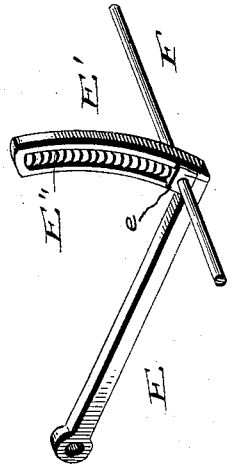
Witnesses:
L. C. Hills.
J. M. Fowler Jr.
Inventor:
Walter H. Jarmin
by Chas. C. Adamson
his Atty.

UNITED STATES PATENT OFFICE.

WALTER H. JARMIN, OF OSCEOLA, NEBRASKA.

CHECK-ROW ATTACHMENT FOR CORN-PLANTERS.

SPECIFICATION forming part of Letters Patent No. 565,902, dated August 18, 1896.

Application filed January 11, 1896. Serial No. 575,132. (No model.)

*To all whom it may concern:*

Be it known that I, WALTER H. JARMIN, a citizen of the United States, residing at Osceola, in the county of Polk and State of Nebraska, have invented certain new and useful Improvements in Check - Row Attachments for Corn-Planters; and I do hereby declare the following to be a full, clear, and exact description of the invention, such as will enable others skilled in the art to which it appertains to make and use the same.

This invention relates to a new and useful improvement in check-row corn-planters; and it consists in the construction and arrangement of parts hereinafter described, and definitely pointed out in the claims.

The aim and purpose of this invention is to construct a check-row corn-planter which is provided with markers supported upon a horizontal shaft to operate the planting mechanism, and wherein the markers are supported on the ground with a yielding pressure, so that they can raise if they should strike an obstruction, such as a root or stone, and are provided with teeth, which enter the ground at stated intervals, and gearing connecting the said horizontal shaft and planter mechanism to operate the dropper-valve at the same time that the teeth on the marker enter the ground. These and other objects not hereinbefore specified are accomplished by the construction illustrated in the accompanying drawings, wherein like letters of reference indicate corresponding parts in the several views, and in which—

Figure 1 is a top plan view of the planter and marker attached. Fig. 2 is a side elevation thereof. Fig. 3 is a detail view of the connecting-gearing between the horizontal shaft and planter mechanism. Fig. 4 is a top detail view of the planter mechanism and dropper-valve and seed-tube. Fig. 5 is a detail view of the support for the horizontal shaft; and Fig. 6 is a detail view of the seed-box and seed-tube and mechanism therefor.

In the drawings, A represents the planter-frame, which is substantially U-shaped. The rear portion of this frame is supported by the axle A', upon which are journaled the supporting-wheels A''. The front portion of the frame is connected with the sled-frame B, which is supported by the runners B', which rest upon the ground and perform their usual function of making a furrow, in which the corn is dropped, which is afterward covered up by the supporting-wheels, which are arranged on a longitudinal line with the runners. The forward ends of these runners are turned up and are connected to the frame B.

B'' is the pole, secured to the frame B.

C are braces connecting the opposite sides of the planter-frame. Upon the rear brace is placed the seat C', and pivotally supported to the front brace is the ground-marker rod C'', upon the free end of which is secured the ground-marker c.

D is a rod pivoted to the pole B''. The end of this rod is connected to the end of the ground-marker rod by the rope D'.

The above-described parts are of the usual construction of corn-planters, and it is not thought necessary to enter more into the details thereof.

Rigidly secured to the opposite ends of the axle A' beyond the supporting-wheels are the rearwardly - extending arms E. Upon the ends of these arms are the upwardly-extending guide-boxes E'. These guide-boxes are formed in a segment of a circle, for a purpose hereinafter described, and as plainly shown in Fig. 5.

E'' is a coiled spring placed within the guide-boxes. The upper end of this spring is secured to the top of the guide-box and the lower end bears against a sliding block e, which is supported on the arm and is provided with shoulders to prevent the same from working out of the guide-boxes. Passing through these blocks is the horizontal shaft F, and upon the opposite ends of this shaft are the marker-wheels F'.

Secured to the marker-wheels and a sufficient distance beyond the periphery thereof are the blades or paddles F''. There are four of these blades or paddles on each wheel, and they consist of flat pieces of steel, or other suitable material, having pointed ends f, so that the blades will readily enter the ground.

Rigidly secured to the shaft F is a sprocket-wheel G, and loosely supported on the axle is a double sprocket-wheel G'.

G'' is a shaft journaled on the planter-frame A in suitable brackets, and upon this shaft is rigidly secured a sprocket-wheel H.

I represents the seed-boxes, which are placed on opposite sides of the frame. Each box is provided with a bottom I', upon which is mounted the plate I'', having the aperture $i$, revolubly supported on the plate.

I''' is the seed-plate, having a series of apertures K therein for the seeds to pass through. The bottom I' is also provided with an aperture $i'$ registering with the aperture in the stationary plate. Surrounding the aperture in the bottom is the usual seed-tube K'. Upon the opposite ends of the shaft G'' are pinions K'', which pass through suitable apertures in the bottom and mesh with teeth L on the seed-plate, as shown in Fig. 4.

M is a sprocket-chain connecting the sprocket-wheel G and double sprocket-wheel G', and N is a sprocket-chain connecting the sprocket-wheel G' and sprocket-wheel H.

R is a notched segment supported on the frame. R' is a lever connected to the axle, and R'' is a spring-pawl on the lever, adapted to enter the notched segment, all of the usual construction. It will thus be seen that the horizontal shaft and marker-wheels can be raised to throw the device out of gear. By forming the guide-boxes in a segment of a circle the shaft can be readily raised without affecting the sprocket-chain M, as it will plainly be seen that on account of the chain the shaft when raised or lowered must describe an arc of a circle.

By supporting the horizontal shaft carrying the marker-wheels on the axle it will be raised or lowered when the axle is raised or lowered owing to the unevenness of the ground, and by further providing the spring for forcing the marker-wheel down upon the ground if the blades thereof should strike a stone or other obstruction the marker-wheel would at once raise and prevent the breaking of the part.

It will be seen by referring to Fig. 3 that the sprocket-wheel G is twice as large as the double sprocket-wheel G' and the sprocket-wheel H is one-half of the size of the double sprocket G'. Therefore the shaft G'' must revolve four times the speed of the shaft F. The shaft G'' is provided with a four-pointed star-wheel O for actuating the dropper mechanism, as hereinafter described. It will be seen from the above, therefore, that there will be four hills dropped at every revolution of the marker-wheels and that a hill will be dropped every time a blade enters the ground, so that the hill will be accurately marked.

It will also be seen that the marker-wheels in recrossing the field will walk back in the old marks. While I have shown the marker-wheel with four blades and the gearing arranged accordingly, I do not desire to limit myself to this number, as it is evident that by varying the size of the wheel the number might be increased to eight blades or other convenient number.

The dropping mechanism is actuated by the four-pointed star-wheel O on the shaft G'' striking the shoulder P' on the shaft P. The opposite ends of this shaft are provided with the cranks S, and the ends of the cranks are pivoted to the links S', and the ends of the links S' are pivoted to the rock-arms S'', which are centrally pivoted on the brackets T on the seed-tubes K', and the ends of the rock-arms S'' are pivotally connected to the gates T'.

It will thus be seen from the above description that when the planter is moving the star-wheel will raise the shoulder P', lowering the cranks S and links S' and one end of the rock-arms S'' and raising the opposite ends and opening the gates in order that the corn may drop at the same time that it is marked by the wheel.

I am aware that many minor changes can be made in the construction and arrangement of parts without in the least departing from the nature and principles of my invention.

I claim—

1. In a corn-planter, the combination with the axle and planter mechanism, of arms extending from the axle, and rigidly secured thereto, a shaft supported on the arms, a marker-wheel rigid on the shaft and gearing connecting the shaft and planter mechanism for actuating the latter, substantially as described.

2. In a corn-planter, the combination with the axle and planter mechanism, of arms extending from the axle, and rigidly secured thereto, a shaft yieldingly supported on the arms, a marker-wheel rigid on the shaft and gearing connecting the shaft and planter mechanism for actuating the latter, substantially as described.

3. In a corn-planter, the combination with the axle and planter mechanism, of arms extending from the axle, and rigidly secured thereto, a guide-box on the end of the arms, a block yieldingly supported in the guide-boxes, a shaft journaled in the boxes, a marker-wheel rigid on the end of the shaft and gearing connecting the shaft and planter mechanism to operate the latter, substantially as described.

4. In a corn-planter, the combination with the axle and planter mechanism, of arms extending from the axle, and rigidly secured thereto, a guide-box on the ends of the arms, a block slidingly secured in the guide-boxes, a spring secured in the guide-boxes normally pressing the blocks down, a shaft journaled on the blocks, a marker-wheel on the shaft and gearing connecting the shaft to the planter mechanism for operating the latter, substantially as described.

5. In a corn-planter, the combination with the axle and planter mechanism, of arms extending from the axle, and rigidly secured thereto, segmental guide-boxes on the arms, a shaft yieldingly supported on the arms in the guide-boxes, a marker-wheel on the shaft and gearing connecting the shaft and planter mechanism for actuating the latter, said gearing being supported on the axle, substantially as described.

6. In a corn-planter, the combination with the axle and planter mechanism, of arms extending rearwardly from the opposite ends of the axle, and rigidly secured thereto, a horizontal shaft yieldingly supported on the arms, marker-wheels rigidly supported on opposite ends of the shaft and gearing connecting the shaft and planter mechanism for actuating the latter, substantially as described.

In testimony whereof I affix my signature in presence of two witnesses.

WALTER H. JARMIN.

Witnesses:
L. A. BELTZER,
W. A. CORNISH.